(12) United States Patent
Dyas et al.

(10) Patent No.: US 11,251,725 B2
(45) Date of Patent: Feb. 15, 2022

(54) ELECTRONIC BRAKING SYSTEM FOR AN IRRIGATION MACHINE

(71) Applicant: Valmont Industries, Inc., Omaha, NE (US)

(72) Inventors: Keating Dyas, Mead, NE (US); Tracy A. Thatcher, Gretna, NE (US)

(73) Assignee: Valmont Industries, Inc., Omaha, NE (US)

( * ) Notice: Subject to any disclaimer, the term of this patent is extended or adjusted under 35 U.S.C. 154(b) by 53 days.

(21) Appl. No.: 16/158,914

(22) Filed: Oct. 12, 2018

(65) Prior Publication Data

US 2019/0052197 A1    Feb. 14, 2019

Related U.S. Application Data

(63) Continuation-in-part of application No. 16/038,859, filed on Jul. 18, 2018, now Pat. No. 10,531,616.

(Continued)

(51) Int. Cl.
*H02P 3/24*     (2006.01)
*A01G 25/09*    (2006.01)

(52) U.S. Cl.
CPC ............ *H02P 3/24* (2013.01); *A01G 25/092* (2013.01)

(58) Field of Classification Search
CPC ................................ A01G 25/092; H02P 3/24

(Continued)

(56) References Cited

U.S. PATENT DOCUMENTS 3,823,730 A    7/1974  Sandstrom et al.
4,138,705 A    2/1979  Doll
(Continued)

FOREIGN PATENT DOCUMENTS

WO         9728692 A1    8/1997
WO      1997028692 A1    8/1997

OTHER PUBLICATIONS

International Application PCT/US2018/055634 International Search Report dated Jan. 31, 2019, 4 pages.

*Primary Examiner* — Jorge L Carrasquillo
(74) *Attorney, Agent, or Firm* — Milligan PC LLO

(57) ABSTRACT

The present invention provides an electronic braking system for an irrigation machine. According to an exemplary preferred embodiment, the present invention includes a drive controller which includes a power supplying circuit which signals an ON condition when a motive power request is input into the drive controller and an OFF condition when motive power is not input into the system. According to a further preferred embodiment, the present invention further includes a 3-phase induction motor connected to apply torque to a drive shaft which is connected to a least one drive wheel. According to a further preferred embodiment, the power supplying circuit supplies 480V AC of motive power to the drive motor when the drive controller signals the ON condition and 10-80V DC of non-motive power to at least one phase of the motor when the drive controller signals the OFF condition. According to a further preferred embodiment, the application of the DC current is applied immediately after the motive power is removed from the drive motor and the application of non-motive power brakes and prevents the drive shaft from turning until the DC current is removed.

2 Claims, 3 Drawing Sheets

Related U.S. Application Data

(60) Provisional application No. 62/534,822, filed on Jul. 20, 2017, provisional application No. 62/572,803, filed on Oct. 16, 2017.

(58) Field of Classification Search
USPC .......................................................... 318/362
See application file for complete search history.

(56) References Cited

U.S. PATENT DOCUMENTS

| | | | |
|---|---|---|---|
| 4,508,269 A | 4/1985 | Davis et al. | |
| 4,549,694 A | 10/1985 | Davis et al. | |
| 4,569,481 A | 2/1986 | Davis et al. | |
| 4,580,731 A | 4/1986 | Kegel et al. | |
| 4,693,425 A | 9/1987 | Meis et al. | |
| 4,763,836 A | 8/1988 | Lyle et al. | |
| 5,246,164 A | 9/1993 | McCann et al. | |
| 5,424,622 A * | 6/1995 | Keller | H02P 3/24 318/364 |
| 5,457,372 A * | 10/1995 | Pignatelli | H02P 3/24 318/375 |
| 5,884,224 A | 3/1999 | McNabb et al. | |
| 5,927,603 A | 7/1999 | McNabb | |
| 6,430,463 B1 * | 8/2002 | Lysaght | B23P 19/066 318/432 |
| 6,755,362 B2 | 6/2004 | Krieger et al. | |
| 8,777,133 B2 | 7/2014 | Korus et al. | |
| 8,936,208 B2 | 1/2015 | Pfrenger | |
| 9,055,720 B2 | 6/2015 | Korus | |
| 9,459,628 B1 | 10/2016 | Abts | |
| 9,622,398 B2 | 4/2017 | Gaus | |
| 9,661,808 B2 | 5/2017 | Abts et al. | |
| 10,209,720 B2 | 2/2019 | Pfrenger | |
| 2006/0027677 A1 | 2/2006 | Abts | |
| 2007/0001035 A1 | 1/2007 | Barker | |
| 2007/0272510 A1 * | 11/2007 | Kawakami | A01D 34/69 192/215 |
| 2013/0253752 A1 | 9/2013 | Grabow | |
| 2014/0111124 A1 * | 4/2014 | Marcetic | H02P 3/22 318/379 |
| 2014/0139151 A1 * | 5/2014 | Sheahan | H02P 3/06 318/375 |
| 2014/0210383 A1 * | 7/2014 | Marcetic | H02P 21/36 318/375 |
| 2014/0225747 A1 | 8/2014 | Abts | |
| 2014/0326808 A1 | 11/2014 | Malsam | |
| 2014/0371971 A1 | 12/2014 | Welch | |
| 2015/0081120 A1 | 3/2015 | Pfrenger | |
| 2015/0316111 A1 | 11/2015 | Tanabe et al. | |
| 2015/0351309 A1 | 12/2015 | Gaus | |
| 2015/0351335 A1 * | 12/2015 | Abts | A01G 25/092 239/728 |
| 2018/0085651 A1 * | 3/2018 | Russo | A63B 24/0087 |
| 2018/0348714 A1 | 12/2018 | LaRue | |
| 2019/0104696 A1 | 4/2019 | Fischman | |

* cited by examiner

ELECTRONIC BRAKING SYSTEM FOR AN IRRIGATION MACHINE

RELATED APPLICATION

The present application is a Continuation-In-Part of U.S. Utility application Ser. No. 16/038,859 filed Jul. 18, 2018; which claims priority to U.S. Provisional Application Ser. No. 62/534,822 filed on Jul. 20, 2017; the present application also claims priority to U.S. Provisional Application Ser. No. 62/572,803 filed on Oct. 16, 2017 which is incorporated by reference in its entirety herein.

BACKGROUND AND FIELD OF THE PRESENT INVENTION

Field of the Present Invention

The present invention relates generally to irrigation machines and, more particularly, to an electronic braking system for an irrigation machine.

Background of the Invention

Modern field irrigation machines are combinations of drive systems and sprinkler systems. Generally, these systems are divided into two types depending on the type of travel they are designed to execute: center pivot and/or linear.

Regardless of being center pivot or linear, common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linear and are fed with water from an outside source (i.e. a well or water line) The essential function of an irrigation machine is to apply an applicant (i.e. water or other solution) to a given location.

Coasting of irrigation machines has been a challenge for many years but has been minimized by operating on relatively level ground. However, in more recent times as mechanized irrigation has expanded and more growers have become more aware of the benefits of mechanized irrigation, machines have been deployed on more uneven terrain. In addition, more growers are using their irrigation machines to apply fertilizers and chemicals and growers are utilizing precision irrigation systems such as variable rate irrigation (VIII) to improve the productivity of their fields. As a result, the problem of coasting drive units has become more visible and of greater concern to growers. One reason for concern is that a coasting drive unit can cause the irrigation machine to effectively slow down or speed up. This can result in over or under application of the irrigation water and/or the chemicals or fertilizers delivered to the field through the machine.

Generally, irrigation machines use pulse-width modulated signals to control the speed of the end tower of the machine. The pulse width modulated signal operates the end tower center drive motor for a percentage of a duty cycle. However, if coasting of the end tower occurs, the machine can traverse that distance faster (forward coasting) or slower (reverse coasting) within a given duty cycle, resulting in the over or under application problems described above. Interior (intermediate) towers operate as needed to keep the spans aligned. When these interior coast in either direction (forward or reverse), the machine may become misaligned, resulting in a shutdown of the machine via the alignment safety system.

Previous approaches to preventing coasting of irrigation machine drive units include utilization of high gear ratio worm drive gear boxes (50:1 or greater) at the drive wheels, creating additional friction within the drivetrain gearboxes via seals, and using high ratio worm center drive gearboxes. Other approaches include mechanical brakes built into the drivetrain. For instance, U.S. Pat. No. 7,073,638 teaches an agricultural irrigation system which includes a ball ramp brake set between a drive gear motor and a divider gear box. Similarly, U.S. Pat. No. 8,215,471 teaches a mechanical brake for use as torque blocker in an actuator drive which includes an axial shifting mechanism arranged on an input drive shaft. Still further, U.S. Pat. No. 3,057,144 teaches a continuous roller brake for a mechanical actuator which has a ball element engaging in a circumferential groove.

For each system of the prior art, the solution to coasting is to create sufficient dynamic friction within the drivetrain (from the motor through the center drive gearbox and through the wheel gearbox) to minimize the spin-down time when power is removed from the motor during the "off period" of the duty cycle, and in some cases, use a mechanical brake or mechanism to prevent mechanical movement during the "off period". However, the weight and inertia of the drive tower may still be enough to cause the tower to continue to move an unacceptable distance, especially on sloped terrain, resulting in the "coasting effect." Further, purely using increased dynamic friction within the drivetrain generates unnecessary wear and heat within the drivetrain components as well as increases the energy consumption of the irrigation machine. In addition, mechanical brakes or mechanisms are subject to high rates of corrosion and wear, especially in the wet environment common with irrigation machines, which can lead to high maintenance costs and high failure rates.

In order to overcome the limitations of the prior art, a system is needed which is able to effectively reduce coasting on uneven surfaces during irrigation operations.

SUMMARY OF THE DISCLOSURE

To minimize the limitations found in the prior art, and to minimize other limitations that will be apparent upon the reading of the specifications, the present invention provides an electronic braking system for an irrigation machine.

According to an exemplary preferred embodiment, the present invention includes a drive controller which includes a power supplying circuit which signals an ON condition when a motive power request is input into the drive controller and an OFF condition when motive power is not input into the system.

According to a further preferred embodiment, the present invention further includes a 3-phase induction motor connected to apply torque to a drive shaft which is connected to a least one drive wheel.

According to a further preferred embodiment, the power supplying circuit of the present invention preferably supplies 480V AC of motive power to the drive motor when the drive controller signals the ON condition and 10-80V DC of non-motive power to at least one phase of the motor when the drive controller signals the OFF condition.

According to a further preferred embodiment, the application of the DC current is applied immediately after the motive power is removed from the drive motor and the application of non-motive power brakes and prevents the drive shaft from turning until the DC current is removed.

DESCRIPTION OF THE PREFERRED EMBODIMENTS

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to'), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Figure 1:
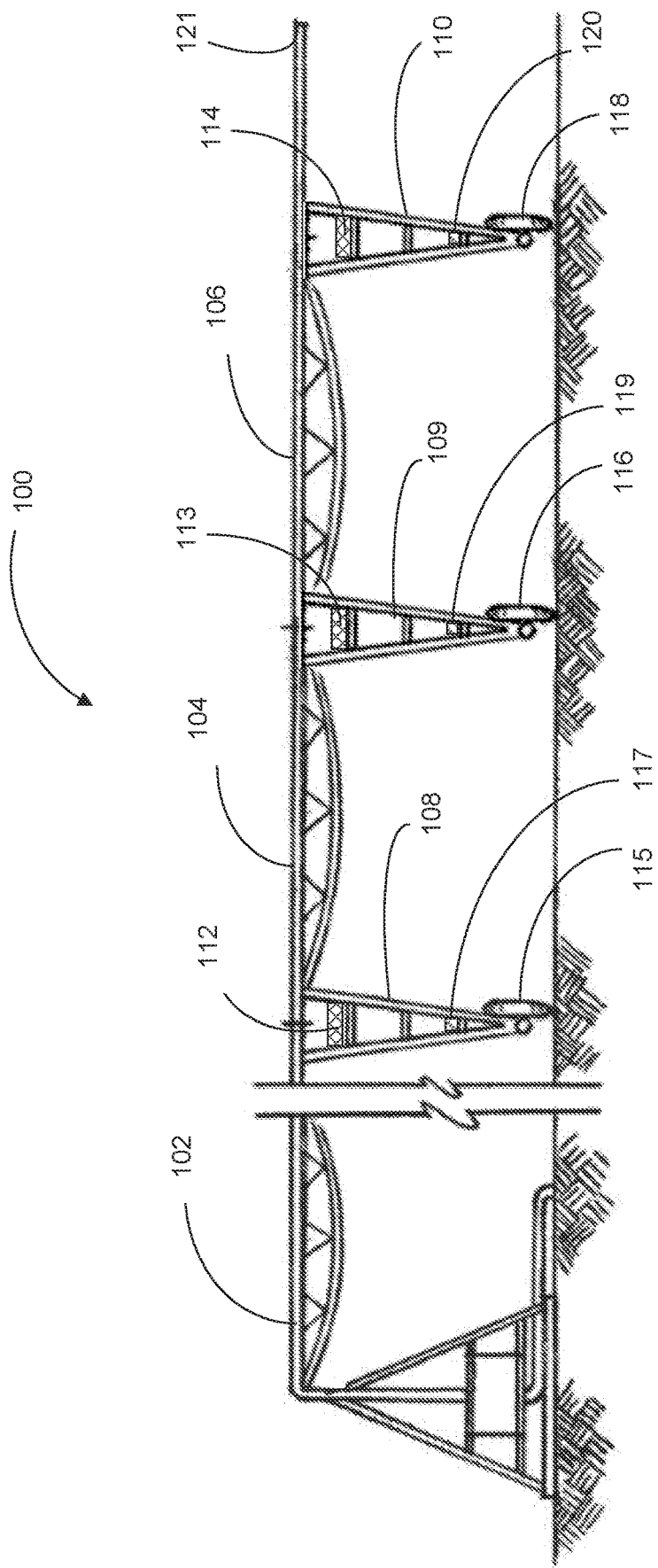
FIG. 1 shows an illustration of an exemplary irrigation machine in accordance with a first preferred embodiment of the present invention.
Figure 2:
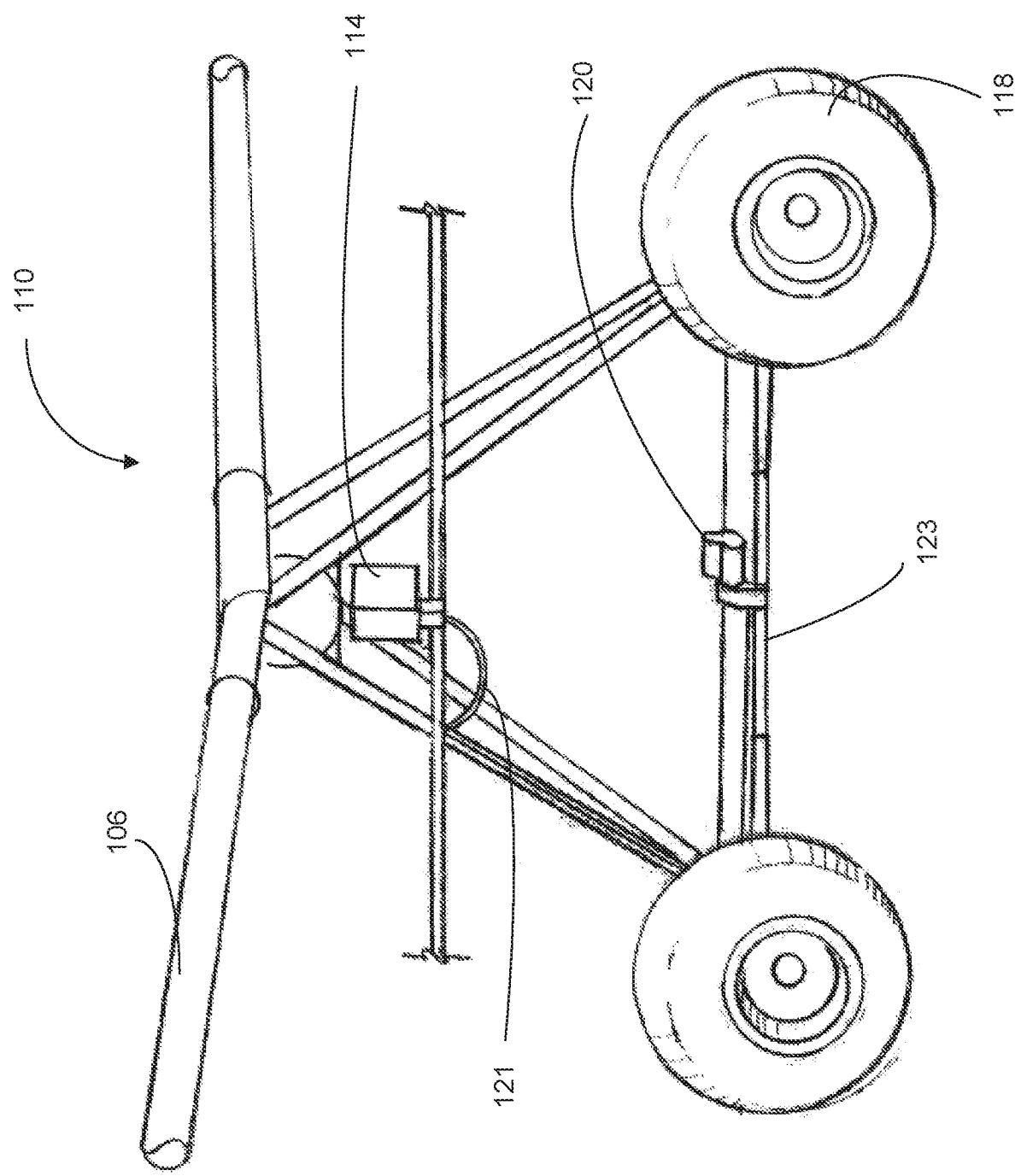
FIG. 2 shows an illustration of an exemplary end tower for the exemplary irrigation machine as shown in FIG. 1.
Figure 3:
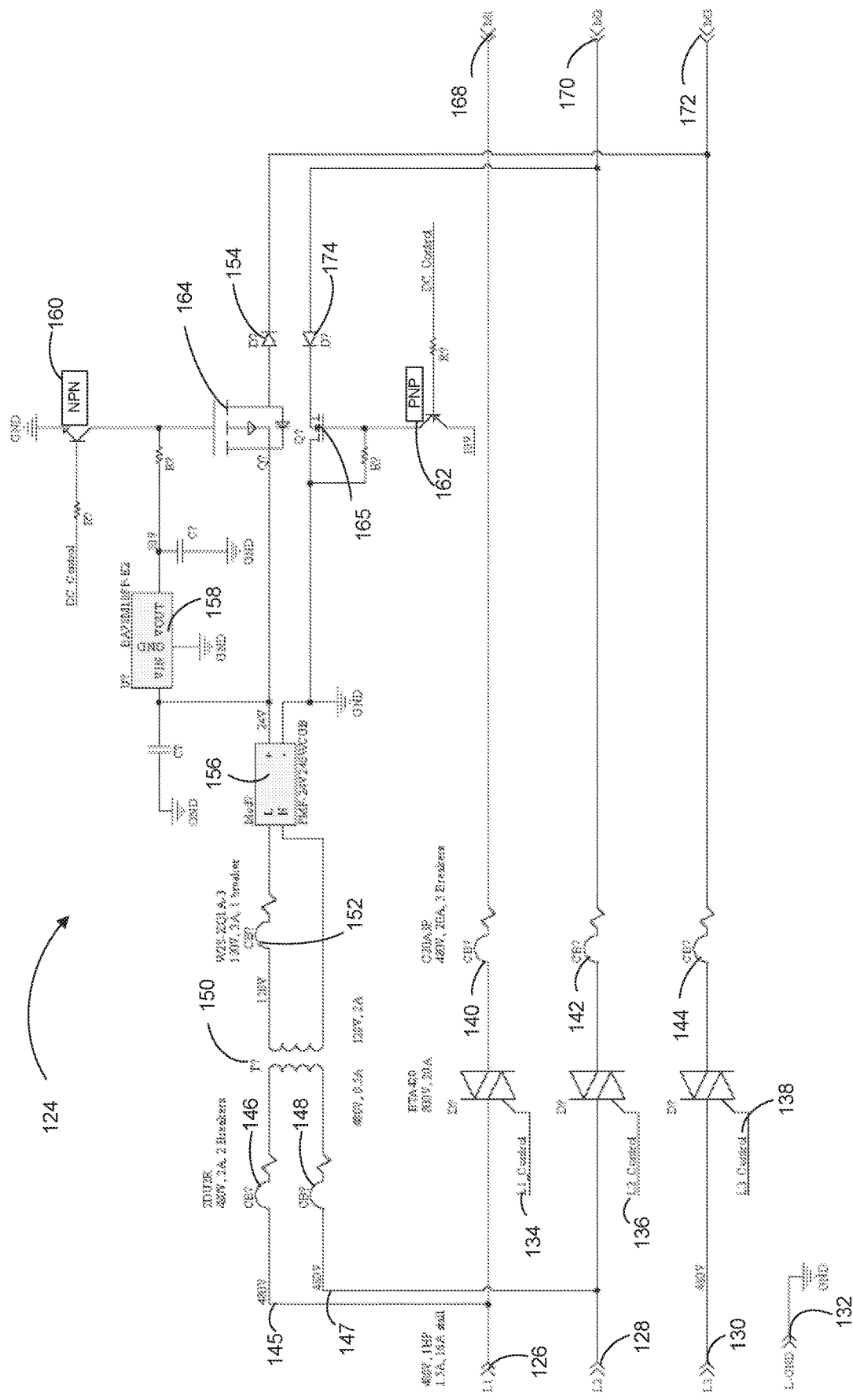
FIG. 3 shows an illustration of an exemplary circuit diagram for the exemplary end tower shown in FIG. 2.

With reference now to FIGS. 1-3, the present invention teaches an improved system for reducing coasting by an irrigation machine. FIG. 1 illustrates an exemplary self-propelled irrigation system 100 incorporating aspects of the present invention shall now be discussed. As should be understood, the irrigation system 100 disclosed in FIG. 1 is an exemplary irrigation system onto which the features of the present invention may be integrated. Accordingly, FIG. 1 is intended to be illustrative and any of a variety of alternative systems (i.e. fixed systems as well as linear and center pivot self-propelled irrigation systems; stationary systems; corner systems and/or bender type systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way.

As shown, FIG. 1 illustrates an exemplary self-propelled irrigation system 100 for use with the present invention. As shown, the irrigation system 100 includes spans 102, 104, 106 supporting drive towers 108, 109, 110. Further, each drive tower 108, 109, 110 is shown with respective drive controllers 112, 113, 114. For each drive tower, 108, 109, 110, the respective drive controllers 112, 113, 114 may generally control respective drive motors 117, 119, 120 and drive wheels 115, 116, 118. Further, the irrigation machine 100 may include an extension/overhang 121 which may include an end gun (not shown). According to alternative embodiments of the present invention, a single irrigation machine may use one or more drive towers in accordance with the present invention in combination with any of a variety of other types of drive towers (including unmotorized) without departing from the scope of the present invention.

With reference now to FIG. 2, an exemplary end drive tower 110 is further shown in more detail. As shown, the drive tower includes a drive controller 114 which is electrically connected via a wire 121 which includes one or more electrical lines for providing power transmission to a drive motor 120. As further shown, the drive motor 120 is mechanically engaged with a drive shaft 123 which applies torque to one more drive wheels 118. According to preferred embodiments, the drive controller 114 and other control elements within the present invention may be solid-state controllers as disclosed in U.S. Provisional Application No. 62/537,026 filed Jul. 26, 2017 which is hereby incorporated by reference herein in its entirety.

In accordance with preferred embodiments of the present invention, the, the tower control unit 114 preferably reacts to the drive status of a drive tower 110. According to a preferred embodiment, in a first drive status where motive power is applied to the drive motor 120, the system preferably may apply AC current to each winding of the drive motor 120. In a second drive status, where motive power is not applied to the drive motor 120, the controller may temporarily apply DC current to one or more windings of the drive motor 120. According to a further preferred embodiment, the temporary DC current is preferably applied to the drive motor 120 immediately after motive power is removed from the windings. In this way, the DC current preferably creates a fixed electromagnetic force within the rotor of motor 120. Preferably, the applied electromagnetic force created by the applied DC current brakes and then prevents the rotor from turning until the DC current s removed as discussed further below.

In accordance with a preferred embodiment of the present invention, by momentarily "freezing" the motor's rotor, the entire drivetrain may preferably be held in place, allowing for the gearboxes in the drivetrain to switch from dynamic friction to a higher state of static friction. According to a preferred embodiment, the higher static friction is preferably sufficient to prevent further movement of the drivetrain, thus eliminating the coasting phenomenon.

According to preferred embodiments, the DC current is preferably injected continuously to a single phase of a 3 phase 480 VAC induction motor when motive power to the motor is removed. According to a second preferred embodiment, the DC current is injected to a single phase of a 3-phase motor until such time as the drivetrain is no longer moving and higher static friction in the drivetrain can be utilized to prevent coasting. According to a third preferred embodiment, after DC injection has halted the rotor and the injection removed, motion of the rotor may be monitored by sensing any induced stator current created by a combination of rotor movement and the residual magnetism in the rotor plate stack. Should motion be sensed, DC injection could then be re-applied for a period of time until rotor motion ceases, or continuously thereafter. According to a further preferred embodiment, the application of the DC current is applied shortly after the motive power is removed from the motor. According to alternative preferred embodiments, the present system may continually operate when motive power is not being applied to the motor, or for longer or shorter periods as needed, or when the machine is not powered (via a separate power supply such as a battery, solar panel, non-switched power source, etc.).

According to further preferred embodiments, the applied current of the present invention may be used with other motor types such as switch reluctance, single phase AC and the like. Further, the present invention may apply other forms of current depending on the selected motor type. Accordingly, the present invention may alternatively apply alternating current (AC) where applicable.

With reference now to FIG. 3, exemplary drive controllers of the present invention may preferably include selected control elements for selectively applying power to elements of the drive motor based on the power status of the motor as discussed above. More specifically, the drive controllers (or other housings) of the present invention may preferably include switching elements to control the application of DC current to one or more of the windings of a drive motor when motive power is removed from the drive motor. Preferably, the power control and switching mechanisms can utilize Solid State Switches (such as MOSFET, IGBT, etc.) or the like in lieu of mechanical switches such as relays.

As shown in FIG. 3, an exemplary circuit 124 for use with aspects of the present invention shall now be further discussed. The circuit 124 is provided to explain novel aspects of the present invention and it should be understood that the circuit elements may be rearranged as desired without departing from the scope of the present invention. In broad terms, the circuit 124 provides a mechanism to convert AC current to DC current at a desired voltage (i.e. 24 VDC, 10 A) to provide a resistive braking force. Further, the circuit includes a controller to detect zero crossing and make control calls based on a measured wave (i.e. a sine wave).

With reference to FIG. 3, input lines 126, 128, 130 are shown coming from the tower controller (not shown) as well as a ground line 132. The voltages used by the present invention may preferably be within any range depending on the motor used and the how the rest of the system is rated. According to a preferred embodiment, the voltage of the system may preferably be 480V. As further shown, the voltages from the input lines 126, 128, 130 may preferably be applied to the motor using high power TRIACs 134, 136, 138. According to a preferred embodiment, the TRIACs 134, 136, 138 may be a device such as the WeEn Semiconductor BTA420-800BT,127 or the like. According to a preferred embedment, the controller may preferably control each winding individually if desired or one control line may be connected to each TRIAC to have them all operate the same. For each respective line, motor switches/circuit breakers 140, 142, 144 may preferably be used as motor protection devices. These may for example be similar to American Electrical part number C20A3P or the like. Alternatively, a fuse (i.e. 10-20 A fuse) or the like may be used.

As further shown, voltage is preferably tapped (via lines 145, 147) from the tower input and passed to a power conversion stage to create DC voltage for injection. Before the injection, circuit protection may be provided. As shown, such protection may be provided with circuit breakers 146, 148 (such as Altech part number 2DU2R or the like). Alternatively, fuses may be used. Thereafter, the inputted voltage may preferably be converted (via a step-down transformer 150) from 480 VAC down to 120 VAC. According to a preferred embodiment, the transformer 150 may have a 4:1 winding ratio to convert 480 VAC down to 120 VAC and provide support for at least 0.5 A for the input and 2 A for the output. Thereafter, further protection may be provided with another fuse or breaker 152 (i.e. such as P&B part number W28-XQ1A-3) prior to AC to DC conversion.

Thereafter, the stepped-down AC signal is preferably converted (via converter 156) from AC to DC for the injection. Although a single converter 156 is shown as Delta Electronics part number PMF-24V240WCGB, any other converter or combination of converters may be used, Further, external modules or on-board modules may also be used to make the conversion as desired. Thereafter, the converted DC current is then preferably applied to the selected motor windings as discussed further below.

According to an alternative preferred embodiment, output from the converter 156 may also supply power for a regulator 158 to efficiently turn the transistors (160, 162 discussed below) ON and OFF. As shown, an exemplary regulator 158 may be a 10V regulator such as Rohm part number BA78M10FP-E2 or the like.

Thereafter, the converted DC current is then applied to the motor windings via control signals applied to switches/transistors 160, 162 which respectively control a P Channel MOSFET 164 and a N Channel MOSFET 165. Further diodes 154, 174 are preferably provided to control current flow as discussed further below.

In exemplary operations, when the motor is ON, the 480V on lines 126, 128, and 130 (L1, L2, L3) are supplied to power the motor. When the motor is OFF, the signals to the lines 126, 128, 130 are OFF and the 480V is cutoff to the motor. The residual magnetic field of the motor collapses over time based on the inductance and capacitance of the circuit. The waveform is very similar to 480V for a period of time.

Responsive to the motor being turned OFF, when the controller detects a zero-cross condition, the controller turns ON the PMOS (High) and NMOS (Low) and thereby turns ON the 24V DC and applies it to selected windings of the motor. The application of the 24V creates a magnetic field that opposes the rotation of the motor. Accordingly, every time the motor spins b the new field, it slows.

According to the circuit 124 discussed above, the DC injection is only ON while the motor voltage is greater than 0 and less then 24V because of the voltage of the injection and the diodes. In this way, the drive shaft and the wheels of a drive tower are first slowed by the injection of the DC current, and then held in place by the DC current until either DC current is dissipated or until motive power is re-applied. In an alternative embodiment, the DC current may be removed after sufficient time to allow the internal static friction of the motor and other drivetrain components to bring the drive train to a complete stop. According to further preferred embodiments, the DC voltage for the DC injection braking may be generated and/or received from a variety of other sources, including an actively powered DC power supply, passive capacitors, batteries and the like. According to further preferred embodiments, a time delay circuit may be used to create a short delay prior to reapplication of motive power to ensure the DC injection circuitry is fully disengaged and isolated. According to further preferred embodiments, DC injection may be applied at other voltages, e.g. 600V, and further may consist of a half-wave rectified signal as opposed to a pure DC voltage. In a further preferred embodiment a pulsed DC voltage may be created by chopping portions of the sine wave from one leg the incoming 480V AC 3-phase power.

The scope of the present invention should be determined not by the embodiments illustrated, but by the appended claims and their legal equivalents.

What is claimed is:

1. In a self-propelled irrigation system having at least one span, a 3-phase induction motor and a drive tower, a power control circuit, wherein the power control circuit comprises:
a first power input line, a first power line control switch and a first motor winding;
a second power input line, a second power line control switch and a second motor winding;
a third power input line, a third power line control switch and a third motor winding;
a first power tap line; wherein the first power tap line is configured to receive power from the first power input line; wherein the first power tap line is connected in series with a step down transformer, an AC-DC converter, a first DC non-motive power switch, a first transistor and the first motor winding;
a second power tap line; wherein the second power tap line is configured to receive power from the second power input line; wherein the second power tap line is connected in series with the step down transformer, the AC-DC converter, a second DC non-motive power switch, a second transistor and the second motor winding;
wherein the step down transformer is configured to step down power received from the first power input line and the second power input line; wherein the AC-DC converter is configured to convert power received from the step down transformer to DC current; and
a power controller; wherein the power controller is configured to detect a motive power state and a non-motive power state; wherein the power controller is configured to set the first, second and third power line control switches to ON positions when the power controller detects the motive power state and to allow AC motive power to be applied to the first, second and third windings;
wherein the power controller is further configured to detect the non-motive power state; wherein the power controller is configured to detect the non-motive power state based on the strength of a magnetic field of the motor; wherein the power controller is configured to switch the first and second DC non-motive power switches to allow the flow of DC non-motive power to at least one of the first, second or third windings in response to the detection of the non-motive power state;
wherein the power controller is configured to apply the DC non-motive power at a pre-determined interval after the AC motive power is removed from the first, second or third windings;
wherein the power controller is configured to apply the DC non-motive power until the rotor motion ceases and the higher static friction in the drivetrain prevents further movement of the drivetrain.

2. In a self-propelled irrigation system having at least one span, a 3-phase induction motor and a drive tower, a power control circuit, wherein the power control circuit comprises:
a first power input line, a first power line control switch and a first motor winding;
a second power input line, a second power line control switch and a second motor winding;
a third power input line, a third power line control switch and a third motor winding;
a first power tap line; wherein the first power tap line is configured to receive power from the first power input line; wherein the first power tap line is connected in series with a step down transformer, an AC-DC converter, a first DC non-motive power switch, a first transistor and the first motor winding;
a second power tap line; wherein the second power tap line is configured to receive power from the second power input line; wherein the second power tap line is connected in series with the step down transformer, the AC-DC converter, a second DC non-motive power switch, a second transistor and the second motor winding;
wherein the step down transformer is configured to step down power received from the first power input line and the second power input line; wherein the AC-DC converter is configured to convert power received from the step down transformer to DC current; and
a power controller; wherein the power controller is configured to detect a motive power state and a non-motive power state;
wherein the power controller is configured to set the first, second and third power line control switches to ON positions when the power controller detects the motive power state and to allow AC motive power to be applied to the first, second and third windings;
wherein the power controller is further configured to detect the non-motive power state; wherein the power controller is configured to detect the non-motive power state at least in part by monitoring stator currents induced by a combination of rotor movement and residual magnetism present in a rotor plate stack;
wherein the power controller is configured to switch the first and second DC non-motive power switches to allow the flow of DC non-motive power to at least one of the first, second or third windings in response to the detection of the non-motive power state;
wherein the power controller is configured to apply the DC non-motive power at a pre-determined interval after the AC motive power is removed from the first, second or third windings;
wherein the power controller is configured to apply the DC non-motive power until the rotor motion ceases and the higher static friction in the drivetrain prevents further movement of the drivetrain.

* * * * *